United States Patent

Magiawala et al.

[11] Patent Number: 5,755,235
[45] Date of Patent: May 26, 1998

[54] PRISONER RESTRAINT APPARATUS FOR A LAW ENFORCEMENT VEHICLE

[75] Inventors: Kiran R. Magiawala, Hawthorne, Calif.; Roger H. Garrell, Lake Orion, Mich.

[73] Assignee: TRW Vehicle Safety Systems Inc., Lyndhurst, Ohio

[21] Appl. No.: 794,473

[22] Filed: Feb. 4, 1997

[51] Int. Cl.$^6$ .................................................. A61B 19/00
[52] U.S. Cl. .......................... 128/869; 128/876; 297/468
[58] Field of Search .................................. 128/846, 869, 128/874, 875, 876; 297/464, 466, 467, 468

[56] References Cited

U.S. PATENT DOCUMENTS

| 3,125,374 | 3/1964 | Bissell | 297/475 |
|---|---|---|---|
| 3,995,885 | 12/1976 | Plesniarski | 297/474 |
| 4,004,583 | 1/1977 | Johnson | |
| 4,568,106 | 2/1986 | Yokoyama | |
| 4,728,553 | 3/1988 | Daniels | |
| 4,784,889 | 11/1988 | Daniels | |
| 4,925,246 | 5/1990 | Corcoran | |
| 4,930,842 | 6/1990 | Wilkinson et al. | |
| 4,974,876 | 12/1990 | Svensson et al. | |
| 4,998,308 | 3/1991 | Farago | 128/869 |
| 5,443,577 | 8/1995 | Kim | 297/468 |

Primary Examiner—Michael A. Brown
Attorney, Agent, or Firm—Tarolli, Sundheim, Covell, Tummino & Szabo

[57] ABSTRACT

A prisoner restraint system (14) restrains kicking movement of a seated prisoner's legs by restraining movement of the prisoner's feet (94, 96) upward from positions resting on a vehicle floor (44), and by restraining forward movement of the prisoner's feet (94, 96). The prisoner restraint system (14) includes seat belt webbing (82, 86), a seat belt buckle (84), and a seat belt locking tongue (80). The prisoner restraint system (14) has an engaged condition in which the tongue (80) is interlocked with the buckle (84) to secure the webbing (82, 86) across the prisoner's lower legs (90, 92).

7 Claims, 1 Drawing Sheet

5,755,235

PRISONER RESTRAINT APPARATUS FOR A LAW ENFORCEMENT VEHICLE

FIELD OF THE INVENTION

The present invention relates to a seat belt system for restraining a prisoner in a law enforcement vehicle.

BACKGROUND OF THE INVENTION

A seat belt system for restraining a seated prisoner in a law enforcement vehicle ordinarily includes seat belt webbing, a seat belt buckle, and a seat belt retractor. A locking tongue on the webbing is releasably lockable in the buckle when the webbing has been extracted from the retractor and moved to a position in which shoulder and lap belt sections of the webbing extend across the prisoner. If the vehicle experiences a crash, a locking mechanism in the retractor blocks further extraction of the webbing. The webbing then restrains movement of the prisoner to protect the prisoner from a forceful impact with parts of the vehicle as a result of the crash. However, such a seat belt system does not restrain kicking movement of the prisoner's legs.

SUMMARY OF THE INVENTION

In accordance with the present invention, a prisoner restraint system for a law enforcement vehicle restrains kicking movement of a seated prisoner's legs. The system restrains kicking movement by restraining movement of the prisoner's feet upward from positions resting on the vehicle floor, and also by restraining forward movement of the prisoner's feet. The system includes seat belt webbing, a seat belt buckle, and a seat belt locking tongue, and has an engaged condition in which the tongue is interlocked with the buckle to secure the webbing across the prisoner's lower legs.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
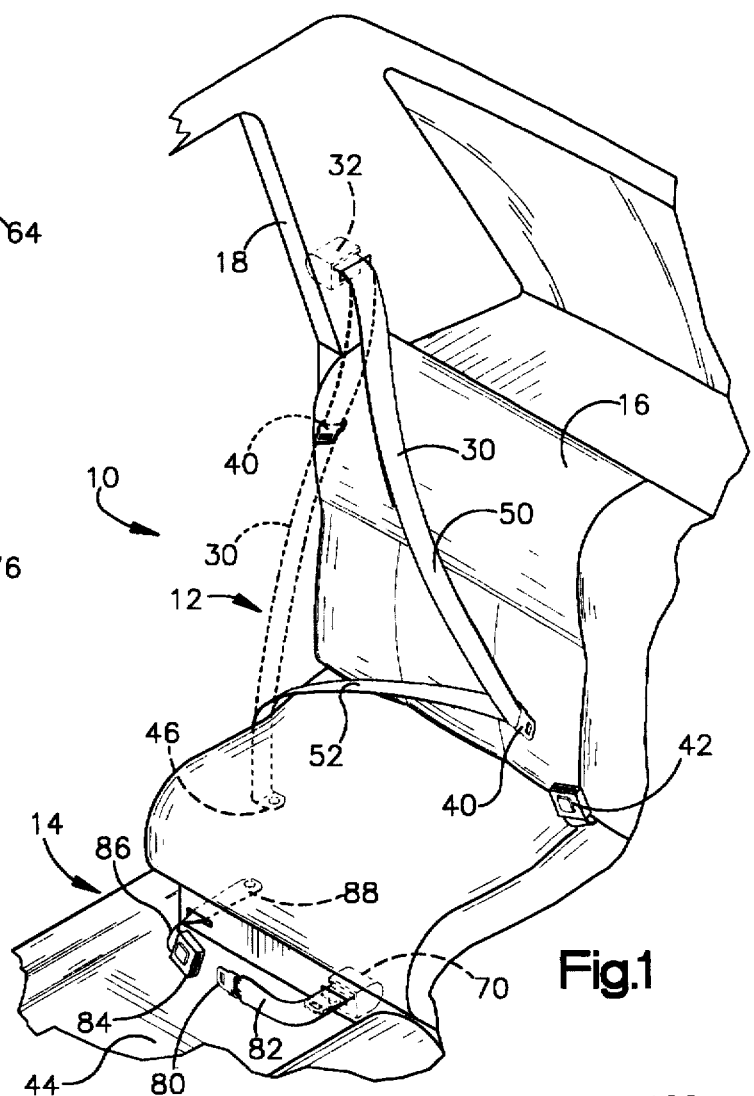
FIG. 1 is a view of an apparatus comprising a first embodiment of the present invention.

An apparatus 10 comprising a preferred embodiment of the present invention is shown in FIG. 1. The apparatus 10 includes first and second vehicle occupant restraint systems 12 and 14 for a rear seat 16 of a vehicle 18. The vehicle 18 is a law enforcement vehicle such as an automobile, truck, van, or the like which is used to transport prisoners. The first restraint system 12 is a three-point seat belt system for restraining an occupant of the seat 16 upon the occurrence of a vehicle crash. The second restraint system 14 is a two-point seat belt system for continuously restraining the same occupant's lower legs. Accordingly, the second restraint system 14 can continuously restrain a seated prisoner's lower legs so that the prisoner can not kick parts of the vehicle such as an adjacent door, window, front seat, or security grill.

Figure 2:
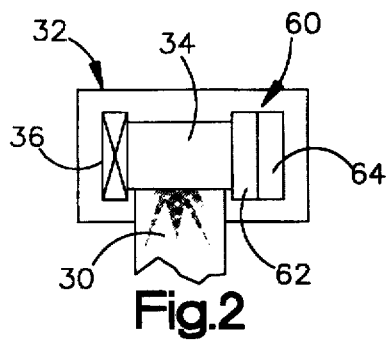
FIG. 2 is a schematic view of parts of the apparatus of FIG. 1.

The first restraint system 12 includes seat belt webbing 30 and a seat belt retractor 32 for the webbing 30. As shown schematically in FIG. 2, the retractor 32 has a spool 34 upon which the webbing 30 is wound. A rewind spring 36 biases the spool 34 to rotate in a winding direction. The webbing 30 is movable back and forth between a fully retracted position and a fully extracted position upon winding and unwinding of the webbing 30 on the spool 34.

The first restraint system 12 further includes a seat belt locking tongue 40 and a seat belt buckle 42. The tongue 40 is preferably slidable along the length of the webbing 30, and is releasably lockable in the buckle 42. The buckle 42 is anchored directly to the seat 16, or directly to the vehicle floor 44, in a known manner.

When the webbing 30 is in the fully retracted position, it extends downward beside the seat 16 from the retractor 32 to an anchor 46, as shown in dashed lines in FIG. 1. The anchor 46 fixes the webbing 30 to the seat 16 or to the floor 44 in a known manner. When the webbing 30 is in the extracted position shown in solid lines in FIG. 1, it is extracted from the retractor 32 sufficiently to enable the tongue 40 to reach the buckle 42. A shoulder belt section 50 of the webbing 30 then extends across the seat 16 from the retractor 32 to the tongue 40. A lap belt section 52 of the webbing 30 extends across the seat 16 from the anchor 46 to the tongue 40.

The rewind spring 36 (FIG. 2) in the retractor 32 is stressed as the spool 34 rotates in an unwinding direction when the webbing 30 is being extracted from the retractor 32 and the tongue 40 is being moved toward the buckle 42. When the tongue 40 is released from the buckle 42, the rewind spring 36 rotates the spool 34 in the winding direction to retract the webbing 30 into the retractor 32, and thereby to move the webbing 30 back to the fully retracted position.

The retractor 32 further includes a locking assembly 60. The locking assembly 60 blocks further extraction of the webbing 30 when the webbing 30 is required to restrain the occupant of the seat 16. Preferably, the locking assembly 60 includes both an emergency locking mechanism 62 and an automatic locking mechanism 64. The emergency locking mechanism 62 blocks unwinding rotation of the spool 34 in response to an emergency condition such as, for example, vehicle roll-over, sudden vehicle deceleration, or sudden extracting movement of the webbing 30. The automatic locking mechanism 64, which is sometimes referred to as a cinch mechanism, continuously blocks unwinding rotation of the spool 34. Such an automatic locking mechanism may be actuated in response to extraction of the webbing 30, locking of the tongue 40 in the buckle 42, or any other condition indicating that an occupant of the seat is wearing the webbing 30 for protection upon the occurrence of a vehicle crash.

Figure 3:
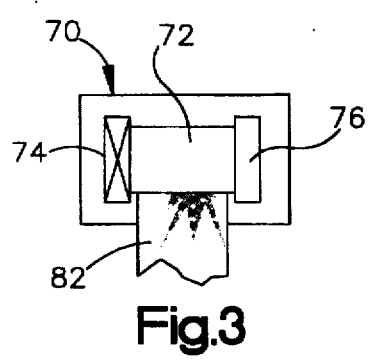
FIG. 3 is a schematic view of other parts of the apparatus of FIG. 1.

The second restraint system 14 also includes a retractor 70. The retractor 70 may be mounted on the seat 16 or the floor 44, but is preferably mounted on the floor 44 at an inboard location beneath the seat 16. Any suitable fastening structure may be used to fix the retractor 70 securely to the floor 44. Like the retractor 32 in the first restraint system 12, the retractor 70 in the second restraint system 14 includes a spool 72 (FIG. 3), a rewind spring 74, and an automatic locking mechanism 76. An optional emergency locking mechanism also could be included in the retractor 70.

The second restraint system 14 further includes a seat belt locking tongue 80 fixed to a first section 82 of seat belt webbing, and a seat belt buckle 84 fixed to a second section 86 of seat belt webbing. The first webbing section 82 is wound on the spool 72 (FIG. 3) in the retractor 70. An anchor 88 fixes the second webbing section 86 to the floor 44 at an outboard location beneath the seat 16. If the retractor 70 were mounted on the seat 16, as noted above, the second webbing section 86 would preferably be mounted directly on the seat 16 rather than the floor 44.

When the first webbing section 82 is in its fully retracted position, as shown in dashed lines in FIG. 1, it preferably extends outward from beneath the seat 16 only far enough for the tongue 80 to be easily accessible to a law enforcement officer reaching into the vehicle 18 across a seated prisoner. When the first webbing section 80 is in the extracted position shown in solid lines in FIG. 1, it extends outward from beneath the seat 16 sufficiently for the tongue 80 to be locked in the buckle 84 at the end of the second webbing section 86.

Figure 4:
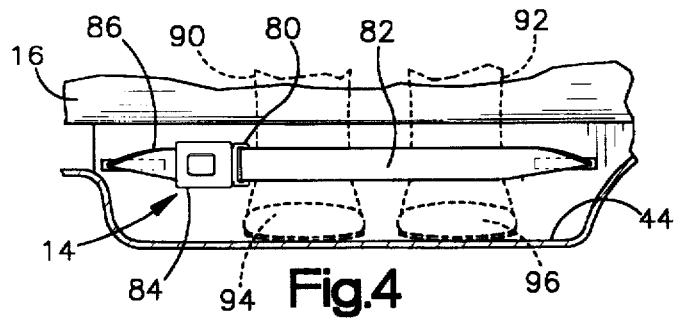
FIG. 4 is a front view of parts of the apparatus of FIG. 1.

The second restraint system 14 has an engaged condition, as shown in FIG. 4. The tongue 80 is then locked in the buckle 84, and the first and second webbing sections 82 and 86 together extend across a seated prisoner's lower legs 90 and 92. The second restraint system 14 then restrains kicking movement of the prisoner's legs. More specifically, FIG. 4 shows the prisoner's lower legs 90 and 92 in positions taken when the prisoner is in an upright seated position on the seat 16, with the prisoner's feet 94 and 96 resting on the floor 44 in front of the seat 16. The second restraint system 14 then restrains movement of the prisoner's feet 94 and 96 upward from the floor 44, and also restrains movement of the prisoner's feet 94 and 96 in a forward direction away from the seat 16.

In accordance with a particular feature of the present invention, the buckle 84 is located on the outboard side of the seated prisoner's lower legs 90 and 92 when the second restraint system 14 is in the engaged condition of FIG. 4. This ensures that the buckle 84 is easily accessible to a law enforcement officer reaching into the vehicle to unlock the tongue 80 from the buckle 84.

Figure 5:
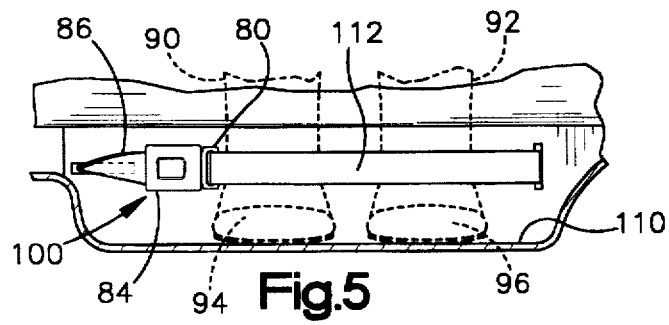
FIG. 5 is a view similar to FIG. 4 showing parts of an apparatus comprising a second embodiment of the present invention.
Figure 6:
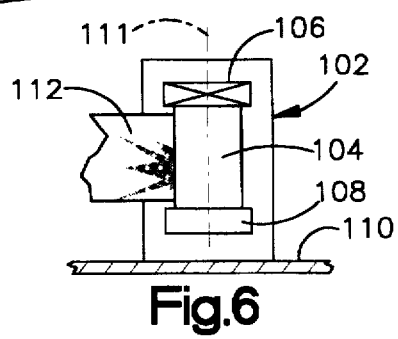
FIG. 6 is a schematic view of parts of the apparatus of FIG. 5.

A second embodiment of the present invention comprises a prisoner restraint system 100, as shown in FIGS. 5 and 6. The prisoner restraint system 100 in the second embodiment has several parts that are substantially the same as corresponding parts of the prisoner restraint system 14 in the first embodiment. This is indicated by the use of the same reference numbers for such corresponding parts in FIGS. 5 and 4. However, as shown in FIG. 6, the prisoner restraint system 100 includes a retractor 102 which differs somewhat from the retractor 30 described above. The retractor 102 includes a spool 104, a rewind spring 106, and an automatic locking mechanism 108, but is mounted on a corresponding vehicle floor 110 in a vertically extending orientation. Specifically, the spool is supported for rotation about a vertically extending axis 111. A section 112 of seat belt webbing extends from the retractor 102 such that its width extends vertically rather than horizontally. This helps to avoid creasing of the webbing section 112 when the restraint system 100 is in the engaged condition of FIG. 5.

Figure 7:
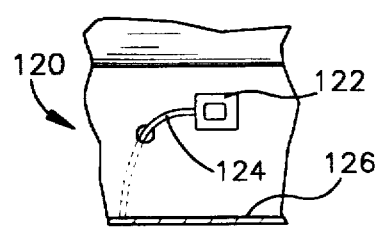
FIG. 7 is a partial view of an apparatus comprising a third embodiment of the present invention.

A third embodiment of the present invention is shown partially in FIG. 7. In the third embodiment, a prisoner restraint system 120 includes a buckle 122 which is mounted on an anchor cable 124 rather than a section of seat belt webbing. The anchor cable 124 is fixed to the corresponding vehicle floor 126 in any suitable manner known in the art. The buckle 122 is thus supported by the anchor cable 124 in a predetermined position for receiving a seat belt locking tongue in the manner shown in FIGS. 4 and 5.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a vehicle seat for supporting a prisoner in an upright seated position in which said prisoner's feet rest on a vehicle floor in front of said seat;
   a first prisoner restraint system permanently anchored relative to said seat, said first prisoner restraint system including a retractor, a section of seat belt webbing extending from said retractor, a locking tongue, and a seat belt buckle in which said tongue is releasably lockable when said section of webbing has been placed across said prisoner in said upright seated position, said retractor having a locking mechanism which blocks extraction of said section of webbing from said retractor during a vehicle crash; and
   a second prisoner restraint system permanently anchored relative to said seat, said second prisoner restraint system including a second section of seat belt webbing which is movable across said prisoner's lower legs, a second locking tongue, and a second seat belt buckle in which said second tongue is releasably lockable when said second section of webbing has been placed across said prisoner's lower legs;
   said second section of webbing extending from a second retractor, said seat and said second retractor being separately mounted on a vehicle floor.

2. Apparatus as defined in claim 1 wherein said second retractor is anchored at an inboard location relative to said seat, said second buckle being anchored at an outboard location relative to said seat so as to be located only on an outboard side of said seat when said second tongue is locked in said second buckle.

3. Apparatus as defined in claim 1 wherein said second section of seat belt webbing is wound on a spool in said second retractor, said spool being supported for rotation about a vertically extending axis.

4. Apparatus as defined in claim 1 wherein said second retractor includes an automatic locking mechanism and does not include an emergency locking mechanism.

5. Apparatus comprising:
   a vehicle seat for supporting a prisoner in an upright seated position in which said prisoner's feet rest on a vehicle floor in front of said seat;
   a first prisoner restraint system permanently anchored relative to said seat, said first prisoner restraint system including a retractor, a section of seat belt webbing extending from said retractor, a locking tongue, and a seat belt buckle in which said tongue is releasable lockable when said section of webbing has been placed across said prisoner in said upright seated position, said retractor having a locking mechanism which blocks extraction of said section of webbing from said retractor during a vehicle crash; and a second prisoner restraint system permanently anchored relative to said seat, said second prisoner restraint system including a second section of seat belt webbing which is movable across said prisoner's lower legs, a second locking tongue, and a second seat belt buckle in which said second tongue is releasably lockable when said second section of webbing has been placed across said prisoner's lower legs;

said second section of webbing extending from a second retractor, said second retractor being mounted on said seat.

6. Apparatus as defined in claim 5 wherein said second retractor is anchored at an inboard location relative to said seat, said second buckle being anchored at an outboard location relative to said seat so as to be located only on an outboard side of said seat when said second tongue is locked in said second buckle.

7. Apparatus as defined in claim 5 wherein said second retractor includes an automatic locking mechanism and does not include an emergency locking mechanism.

* * * * *